March 6, 1962  H. WEINRICH ET AL  3,023,639
TRANSMISSION BRAKE SYSTEM
Filed March 25, 1959  6 Sheets-Sheet 1

INVENTORS
*Hellmut Weinrich*
*Herbert W. Muller*
*Johannes L. Peltner*

BY *Strauch, Nolan & Neale*
ATTORNEYS

INVENTORS
Hellmut Weinrich
Herbert W. Müller
Johannes L. Peltner
BY Strauch, Nolan & Neale
ATTORNEYS

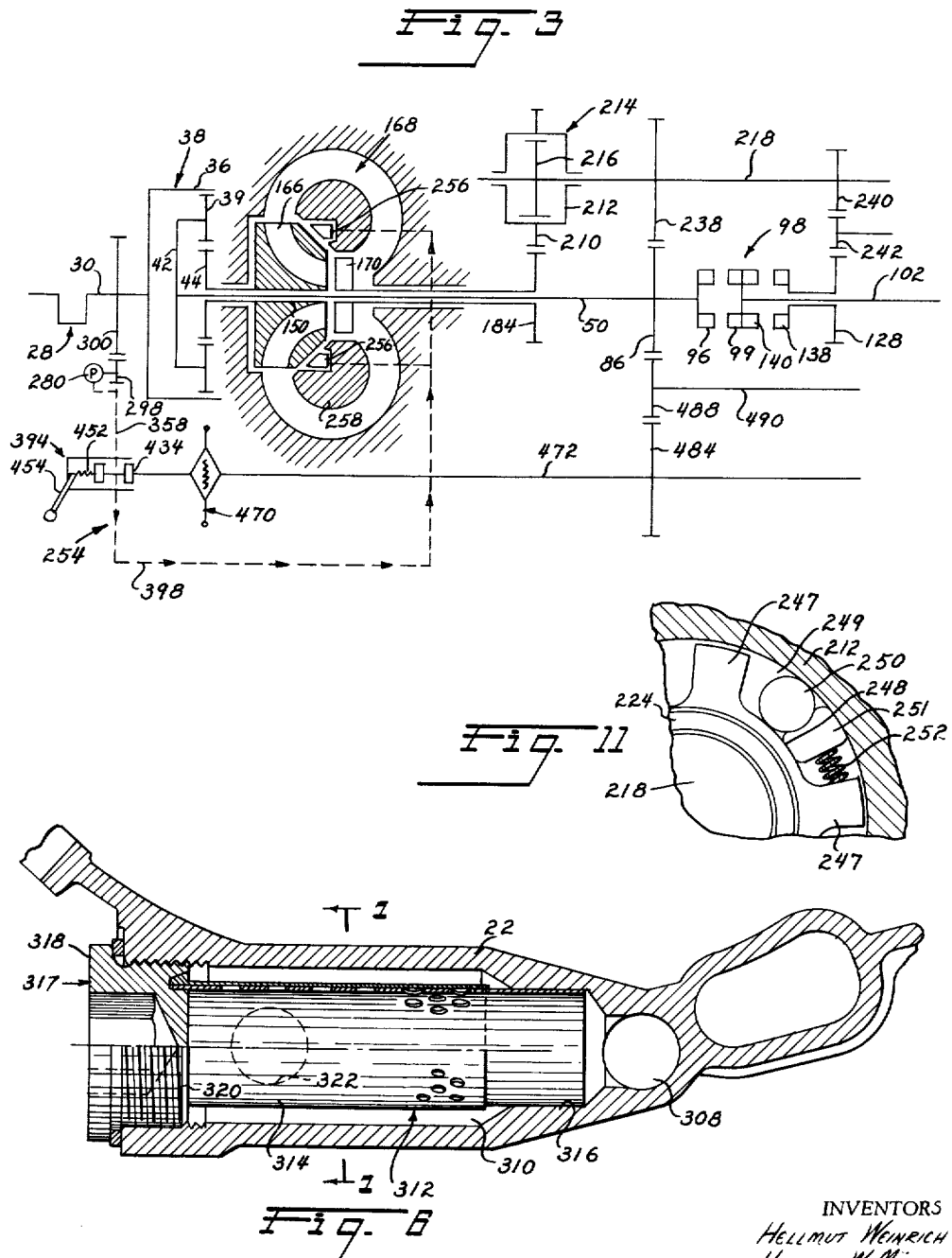

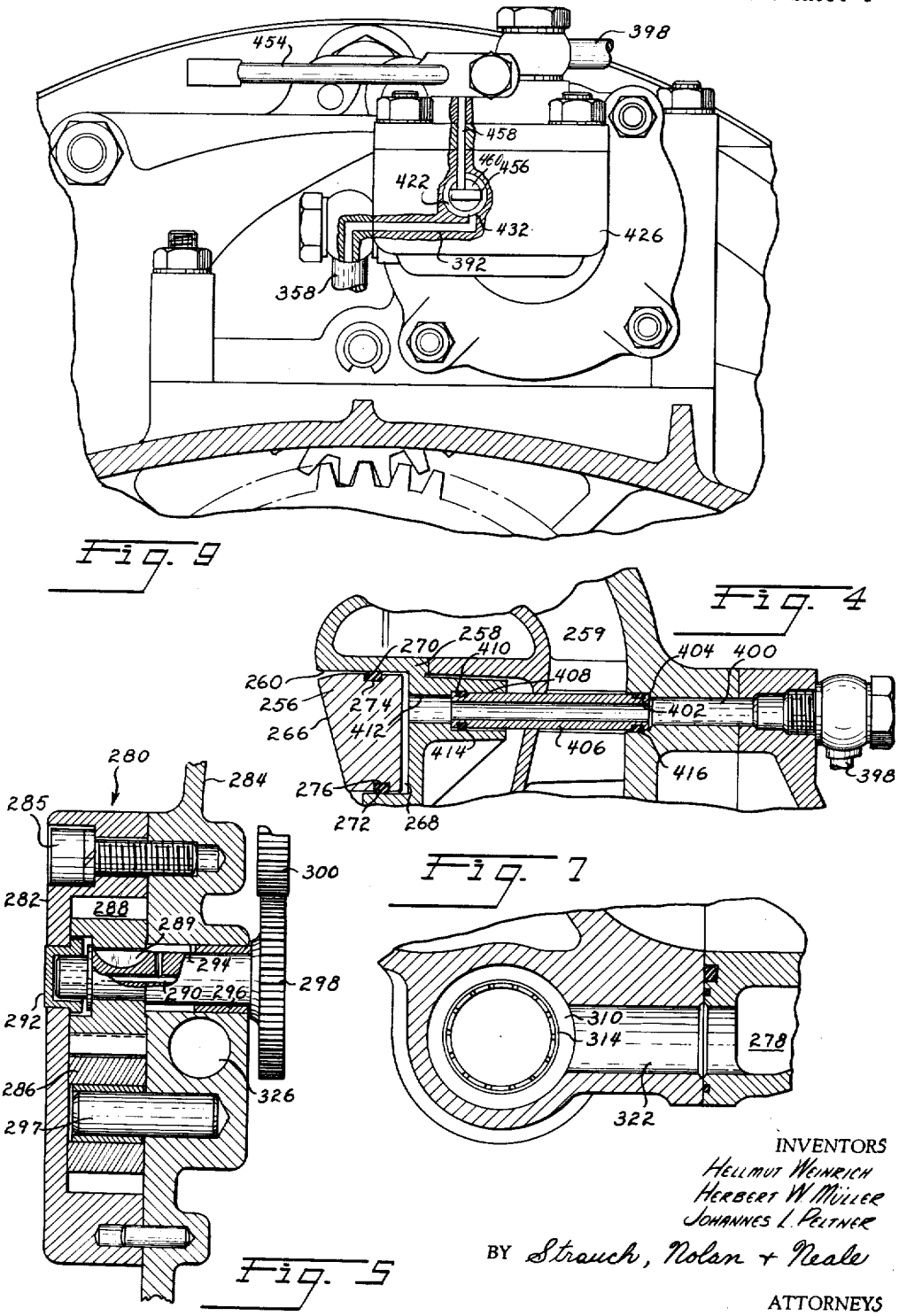

March 6, 1962 H. WEINRICH ET AL 3,023,639
TRANSMISSION BRAKE SYSTEM
Filed March 25, 1959 6 Sheets-Sheet 5
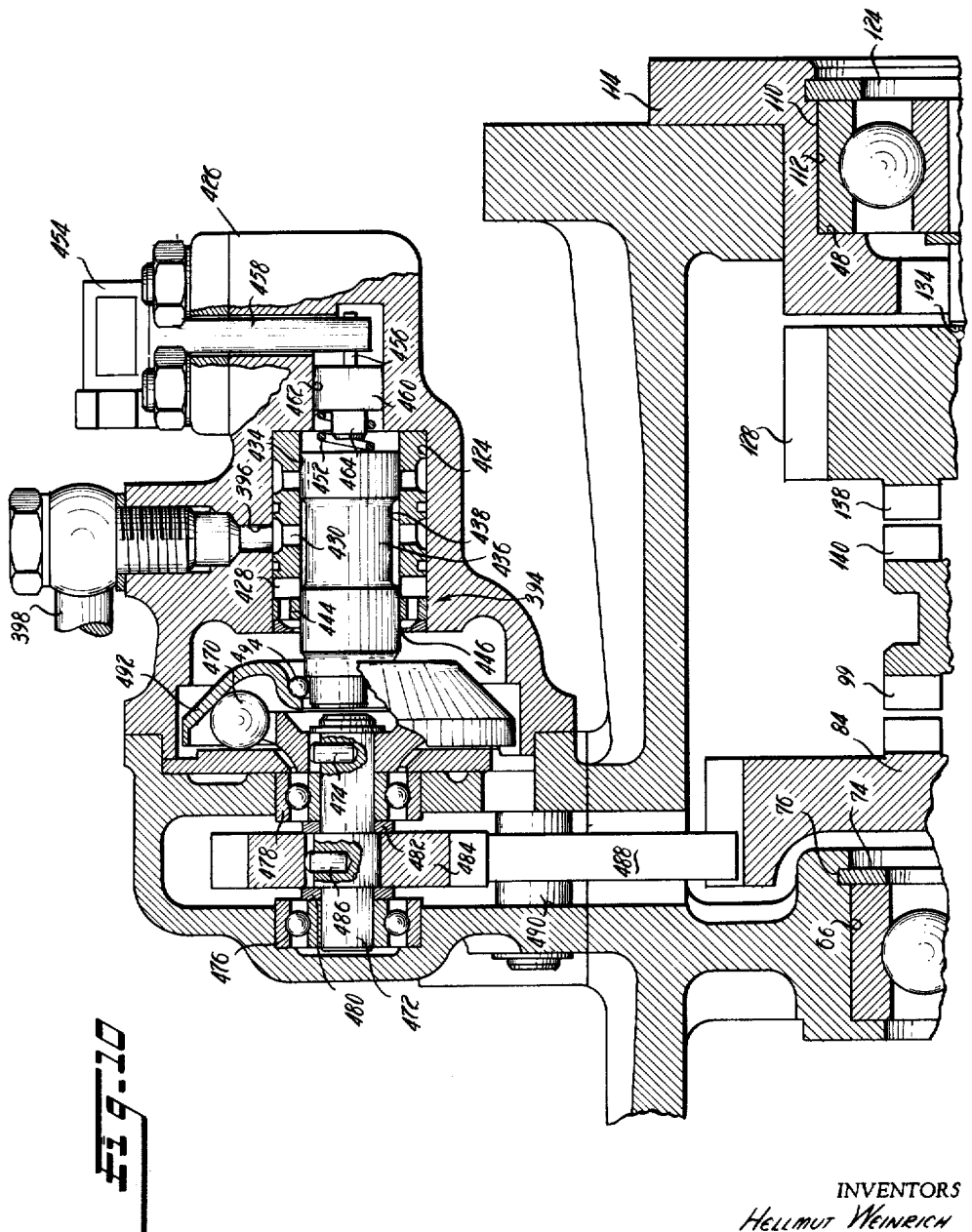
INVENTORS
HELLMUT WEINRICH
HERBERT W. MÜLLER
JOHANNES L. PELTNER
BY
ATTORNEYS

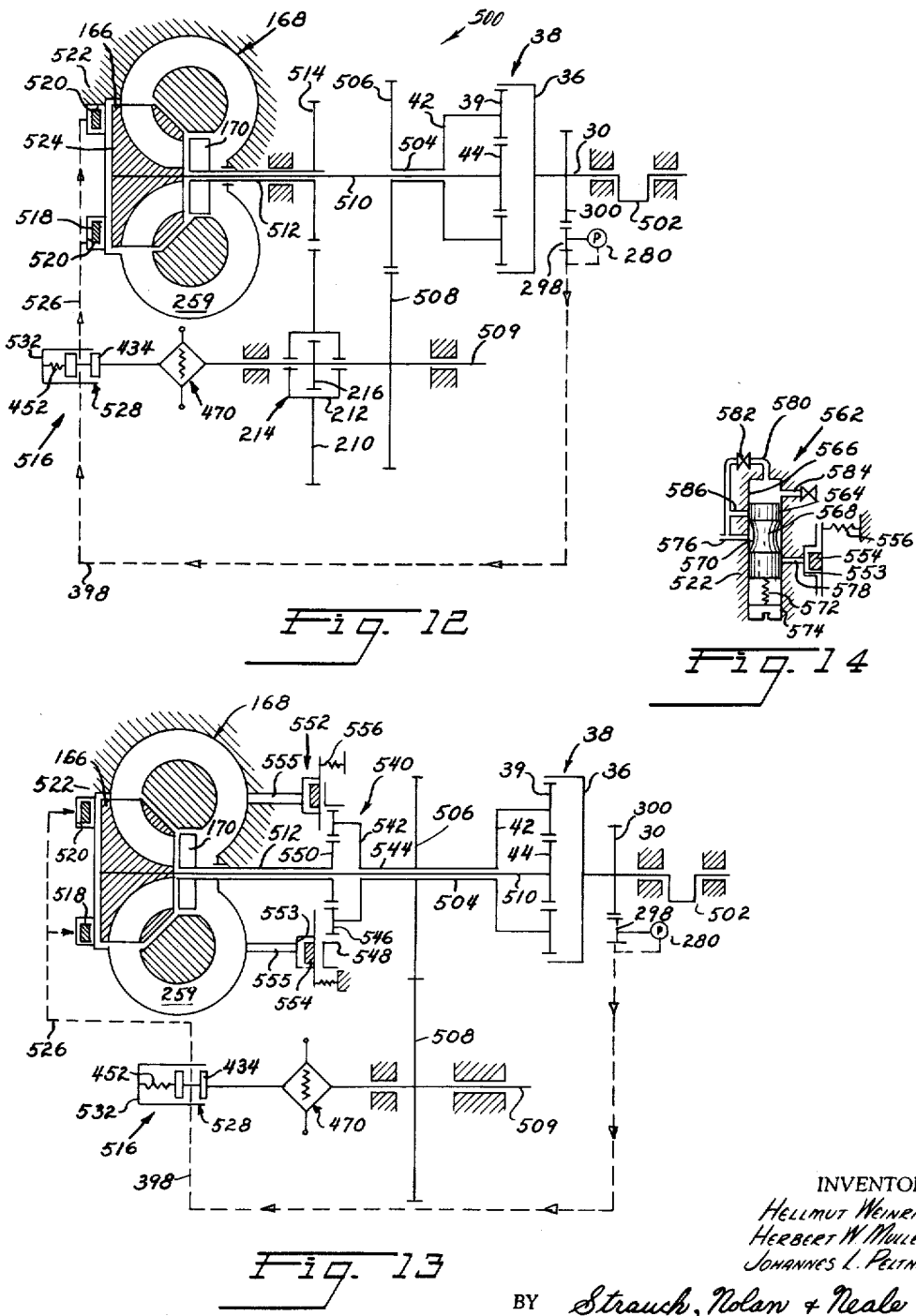

United States Patent Office 3,023,639
Patented Mar. 6, 1962

3,023,639
TRANSMISSION BRAKE SYSTEM
Hellmut Weinrich and Herbert W. Müller, Pinneberg, near Hamburg, and Johannes Peltner, Appen, Post Utersen, Germany, assignors, by mesne assignments, to Voith-Getriebe, K.G., Heidenheim (Brenz), Germany, a corporation of Germany
Filed Mar. 25, 1959, Ser. No. 801,746
24 Claims. (Cl. 74—688)

This invention relates to torque converters and particularly to a brake system for a torque converter in a power shunt transmission.

In the hydrodynamic power shunt transmissions in which the principles of the present invention are embodied, the transmission power input is divided and transmitted through the transmission by two power trains over a selected range of operation. Part of the power input is transmitted mechanically by a main shaft directly through a differential to the output shaft while the remainder of the power is divided or shunted to the output shaft through a torque converter. In a transmission of this type the hydraulic torque converter is utilized to provide a torque multiplication to the transmission output shaft when the output shaft of the transmission is rotating at low angular velocity. As the output speed increases, the torque multiplication from the torque converter decreases. Eventually, the point is reached where the torque converter ceases to contribute usefully to the overall transmission output. Before this point is reached, it is desirable to stop the rotation of the pump or impeller of the torque converter since its continued rotation induces losses and reduces the overall efficiency of the transmission.

In the past it has been proposed to utilize braking systems to brake the torque converter by braking the impeller or pump during certain transmission driving speeds. Such brake systems are particularly applicable in connection with transmissions of the type described in co-pending application Serial No. 781,495, dated December 19, 1958, of Hellmut Weinrich, one of the inventors herein, wherein the transmission is characterized by a torque converter pump speed which naturally tends to decrease as vehicle speed increases causing the overall transmission efficiency to tend to decrease somewhat as the output speed increases. Thus, at a particular transmission output speed it is economical to transfer all the power delivered to the transmission through the mechanical power train and thereby to provide direct mechanical drive through the transmission. By this construction the efficiency of the transmission becomes mechanical efficiency and may be assumed to be close to 100 percent.

It has been found, however, that the shifting and braking devices presently available for shifting the power from the torque converter train to the mechanical train tend to produce abrupt jerking motions and consequently operate with severe shock to provoke the development of highly undesirable stresses in the transmission assembly and in other parts of the power unit of the vehicle. Moreover, the application of such shifting devices for passenger type vehicles is undesirable in that the smooth riding features are unobtainable since the braking device causes resulting accelerations of the car to be sudden and unexpected to the discomfort of the passengers.

Accordingly, the present invention has, as its purpose and primary object, provision of a novel braking system for shocklessly and smoothly braking the pump or impeller of a torque converter of a power shunt transmission. This is accomplished by providing a piston assembly designed to move axially so that it contacts the pump wheel or impeller to frictionally brake it to a stop. The piston assembly is actuated in accordance with the transmission output speed and the acceleration of the vehicle. Opposing the braking motion of the brake piston assembly is the fluid pressure in the fluid toroid or circuit of the torque converter which cushions the brake actuating force and is slowly overcome by the brake force actuating the piston assembly to a braking position against the pump. Consequently, by this structure, a gradual application of the brake is facilitated and the stopping of the torque converter pump is completely shockless and smooth.

With the foregoing purposes and considerations in mind, it is a further major object of the present invention to provide a novel brake system for shocklessly braking the torque converter impeller of a hydrodynamic power shunt transmission wherein the brake system includes a brake automatically actuated by a control which is dependent upon the output speed of the transmission and concomitantly retarded from actuation by the fluid pressure produced within the torque converter which opposes and cushions actuating movement of the brake to thereby establish a gradual and shockless application of the brake in braking the torque converter impeller.

A further object of the present invention resides in the provision of the braking system as in the preceding object wherein the brake control is further dependent upon the rate of acceleration of the transmission output or of the vehicle.

A further object of the present invention is to provide a braking system for shocklessly and smoothly braking the impeller of the torque converter disclosed in said co-pending application Serial No. 781,495 wherein the torque converter comprises a part of one of two parallel power trains of a hydrodynamic power shunt transmission.

Still another object of the present invention is to provide in a hydrodynamic power shunt transmission wherein part of the power input is transmitted mechanically through a differential to the output and the remainder of the power input is shunted off by the differential and transmitted to the output through a torque converter capable of producing an internal pressure that has the characteristic of decreasing as the output speed increases, a novel braking system for stalling and gradually braking the impeller of the torque converter wherein the braking system is actuated by a hydraulic force at a predetermined output speed of the transmission and is responsive to the internal pressure of the torque converter which opposes and cushions the brake actuating force to prevent abrupt application of the brake.

Still a further object of the present invention resides in the provision of the novel braking system in the preceding object wherein an annular brake piston is provided to frictionally grip the impeller of the torque converter and is actuated by hydraulic fluid pressure controlled by the rate of acceleration of the vehicle driven by the transmission.

A further object of the present invention resides in the provision of the power shunt transmission of the preceding object wherein the torque produced in the torque converter is transmitted to the central driver gear of an epicyclic gear wherein the outer driven gear is provided with a brake which is actuated by the internal pressure of the torque converter.

Still a further object of the present invention resides in the provision of the epicyclic gear brake of the preceding object wherein a control is provided for regulating the delivery of the torque converter pressure for actuating the brake, which control is provided with means for preventing premature gripping of the brake and for eliminating undesired shifting of the brake due to slight variations in the torque converter fluid pressure actuating the brake. These and other objects will presently become apparent by reference to the appended claims and as the description proceeds in connection with the accompanying drawings, wherein:

FIGURE 4 is a fragmentary enlarged detailed view of a portion of FIGURE 1;

FIGURE 5 is a section substantially along the line 5—5 of FIGURE 8;

FIGURE 6 is a section substantially along the line 6—6 of FIGURE 1;

FIGURE 7 is a section substantially along the line 7—7 of FIGURE 6;

FIGURE 8 is a section substantially along the line 8—8 of FIGURE 1;

FIGURE 9 is a fragmentary right hand elevational view of the transmission of FIGURE 1 having a portion of its housing broken away;

FIGURE 10 is an enlarged fragmentary view of the upper portion of the transmission unit of FIGURE 1 illustrating a control valve assembly;

FIGURE 11 is a section substantially along the line 11—11 of FIGURE 1;

FIGURE 12 is a schematic view of a transmission illustrating a further embodiment of the present invention;

FIGURE 13 is a schematic view of a transmission illustrating a still further embodiment of the present invention; and FIGURE 14 is a schematic view of a modified brake system control valve assembly of the transmission of FIGURE 13.

Figure 1:
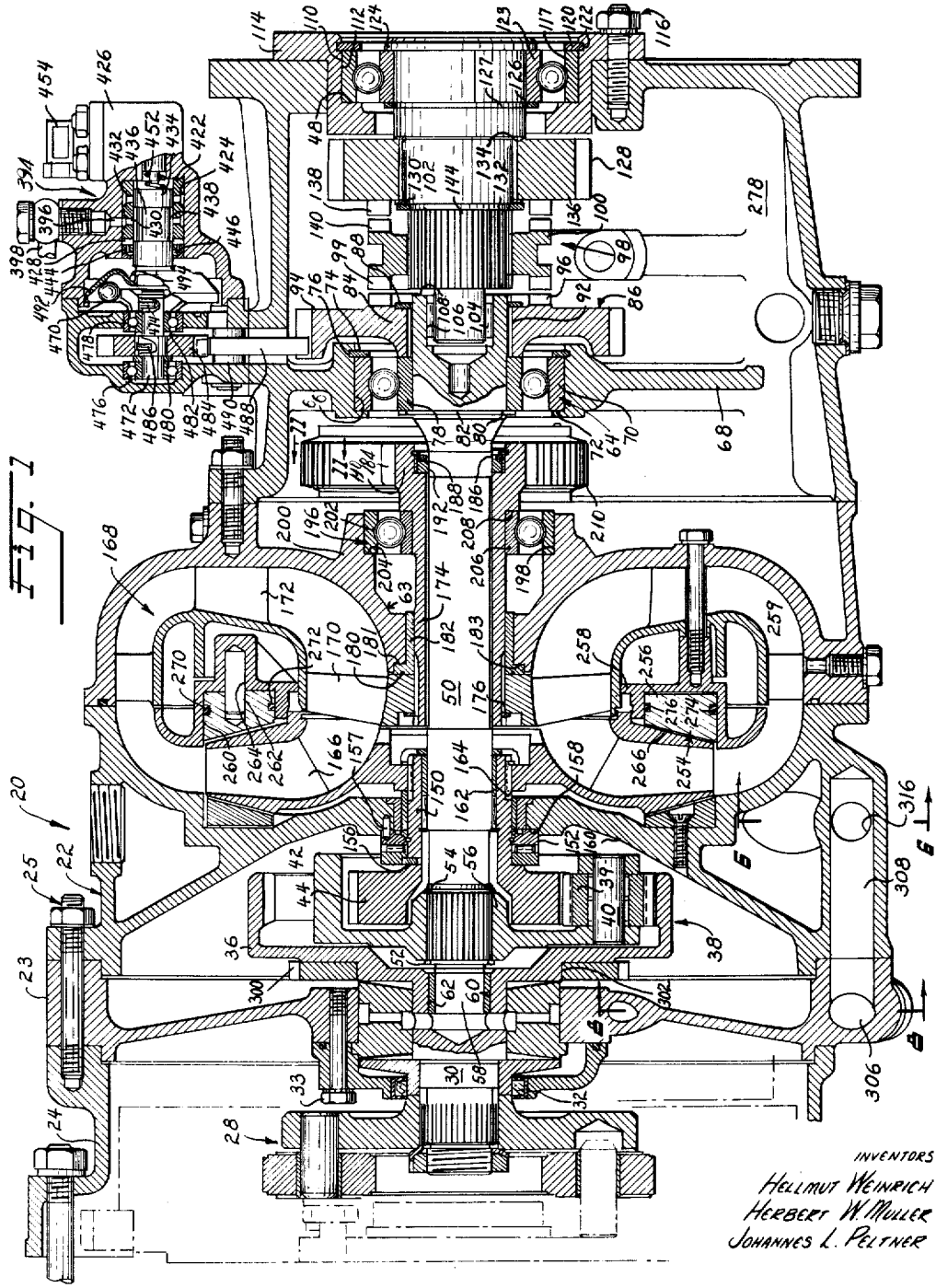
FIGURE 1 is a vertical sectional view illustrating a transmission embodying the principles of the present invention.
Figure 2:
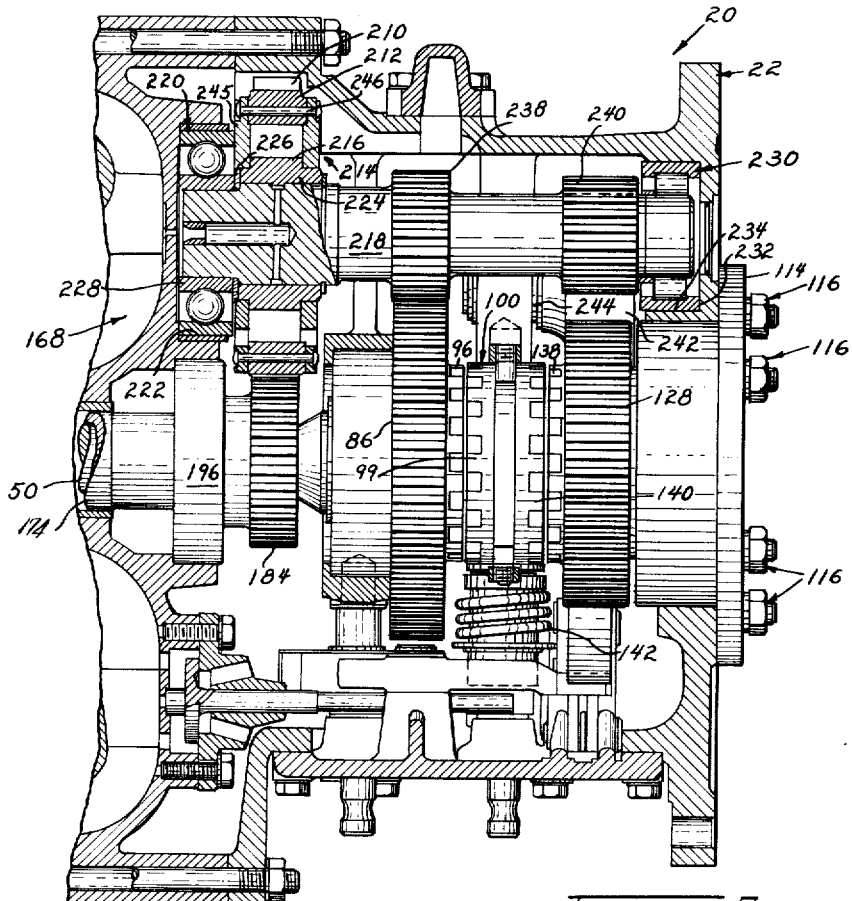
FIGURE 2 is a horizontal sectional view illustrating the right hand portion of the transmission of FIGURE 1 substantially along the axial center thereof.

Referring now to the drawings and more particularly to FIGURES 1 and 2 wherein the construction embodying the principles of the invention are shown, reference numeral 20 generally designates a transmission unit of the general type disclosed and described in said co-pending application Serial No. 781,495. The transmission unit 20 comprises a housing 22 having a removable end plate section 23 secured between the housing 22 and a section of the engine housing 24 by stud and nut assemblies indicated at 25. Drivingly connected to the engine crank shaft (not shown) by a suitable coupling connection 28 is the transmission power input shaft 30 which extends horizontally through the end plate section 23 and a suitable oil seal support plate 32 secured to the end plate section 23 by bolts 33. The shaft 30 is suitably journalled for rotation in the end plate section 23 and terminates at its right end in an internal ring gear 36 which constitutes the input member of an epicyclic planetary gear set generally indicated at 38. The ring gear 36 meshes with a plurality of equi-angularly spaced planet gears 39 mounted for free rotation on pins 40 axially carried by a planetary carrier 42. The planet gears 39, in turn, are in constant meshing engagement with a sun gear 44.

By this planetary gear structure 38, the power input to the transmission unit 20 is divided into two parts. Part of the power input is transmitted through the planetary gear carrier 42 which is splined to a shaft 50 and restrained from axial movement by snap rings 52 and 54. These snap rings 52 and 54 axially abut the opposed planar end faces of the hub 56 of carrier 42 and are seated in annular peripheral grooves formed in shaft 50. The shaft 50 is coaxial with input shaft 30 and is provided with a reduced diameter end section 58 at its left-hand end which is journalled in a suitable sleeve bearing 60 concentrically mounted in an axially formed bore 62 extending inwardly from the planar end face of shaft 30. This shaft 50 extends through a torque converter housing section 63 of the transmission housing 22 and is journalled at its right-hand end by a conventional ball bearing assembly 64.

The bearing assembly 64 is press fitted into a socket 66 formed in a transverse housing rib section 68 and has its outer race 70 axially confined between an annular flange portion 72 integral with the housing section 68 and a snap ring 74 which is seated in an annular peripheral groove 76 formed in the inner side wall of socket 66. The inner race 78 of bearing assembly 64 is restrained against axial movement between a snap ring 80 seated in an annular peripheral groove 82 formed in shaft 50 and the planar end face of the hub portion 84 of a drive gear 86 which is splined to the shaft 50 to the right of the bearing assembly 64. This gear 86 is confined between the inner race 78 of bearing 64 and a snap ring 88 seated in a peripheral groove formed in the end splined section 92 of shaft 50.

The end face 94 of gear 86 is a planar surface normal to the axis of shaft 50 and is provided with conventional protruding jaw clutch teeth 96 which constitute a stationary element of a forward and reverse clutch assembly generally indicated at 98. The jaw clutch teeth 96 are arranged to mesh without clashing with mating jaw clutch teeth 99 provided on an axially shiftable clutch collar 100 which is splined to the output shaft 102 for rotation therewith.

The output shaft 102 is journalled coaxially with shaft 50 at its left-hand end by a suitable bearing indicated at 104 concentrically mounted in an axial bore 106 extending inwardly from the planar end face 108 of shaft 50. The right-hand end of output shaft 102 is journalled by a ball bearing 110 pressed into a socket 112 formed in a housing cup section 114 which is secured to the transmission housing 22 by stud and nut assemblies generally indicated at 116.

The outer race 117 of bearing 110 is confined between an annular shoulder 48 formed integral with the housing section 114 and a snap ring 120 which is seated in an annular peripheral groove 122 formed in the side wall of socket 112. The inner race 123 of bearing 110 is confined between an annular shoulder 124 formed integral at the end of shaft 102 and a snap ring 126 seated in an annular peripheral groove 127 formed in shaft 102.

Between the clutch collar 100 and the housing section 114, a reverse drive gear 128 is mounted for free rotation on output shaft 102. This gear 128 is restrained against axial movement relative to the shaft 102 between a snap ring 130 which is seated in an annular peripheral groove 132 formed in shaft 102 and a shoulder 134 formed integral on shaft 102. The end face 136 opposing the clutch collar 100 of reverse gear 128 is a planar surface normal to the axis of the output shaft 102 and is provided with axially extending jaw clutch teeth 138 which are arranged to mesh with mating jaw clutch teeth set 140 of the clutch collar 100.

The jaw clutch collar 100 is axially shiftable along the splined section 144 of output shaft 102 by a suitable selector fork structure indicated at 142, FIGURE 2, to selectively engage either the forward drive jaw clutch teeth 96 or the reverse drive jaw clutch teeth 138 to effectuate selected rotation of the output shaft 102 as will be hereinafter described.

With continued reference to FIGURES 1 and 2, the other part of the divided power input not transmitted to the shaft 50 is impressed upon the sun gear 44 of the planetary gear set 38 which is provided with an integral axially extending sleeve 150. The sun gear 44 is restrained against axial movement to the right hand side by a thrust bearing 152 which abuts the planar end face of the hub portion 156 of gear 44 and is fixedly seated by pins 157 in an annular groove 158 formed in a housing rib section 160 of the transmission housing 22.

The sleeve 150 of sun gear 44 is concentrically journalled on shaft 50 by a suitable bearing indicated at 162 and extends through the housing section 160 which forms the left half of the torque converter housing generally indicated at 63. This sleeve 150 terminates in a splined section 164 in the torque converter housing 63 and is drivingly connected to the pump impeller 166 of the torque converter which is generally indicated at 168.

The torque converter 168 is identical to the converter described and disclosed in connection with said co-pending application and comprises a bladed turbine rotor 170 rotatably disposed in the housing 63 in concentric surrounding relation to the shaft 50. The transmission fluid passes through the blades of the turbine rotor 170 in an axial direction and parallel to the common axis of rotation of the pump rotor 166 and the turbine rotor 170. A set of fixed guide vanes 172 are provided to eliminate the tangential component flow of fluid with which it leaves the pump 166 so that it enters the turbine 170 in a substantially axial direction as described in said co-pending application. These fixed guide vanes are rigidly fixed to the housing 63 of the converter 168 so as to drive the turbine 170 by the fluid energy produced by the pump 166.

The turbine 170 of the torque converter 168 is splined to a sleeve 174 and axially confined between a snap ring 176 seated in an annular peripheral groove formed in sleeve 174 and the planar face 180 of a collar 181 formed integral with a sleeve member 182 and seated in an annular groove 183 formed in the torque converter housing section 63. The sleeve 174 is journalled in the sleeve member 182 concentrically with the shaft 50 and extends beyond the torque converter housing 63 to terminate at its right-hand end in a driven gear 184. This sleeve 174 is restrained against axial movement between the snap ring 176 and a ball bearing 196 later referred to. A snap ring 186 is seated in an annular peripheral groove formed in the side wall of a recess 188 which extends axially inwardly from the planar end face 190 of the gear 184. The snap ring 186 axially abuts an annular spacer 192 and prevents in connection with this spacer the passage of material oil flow between the sleeve 174 and the shaft 50.

Adjacent to the gear 184, the sleeve is journalled by a ball bearing 196 pressed into a socket 198 formed in a cup-shaped housing portion 200 of the transmission housing 22 so that its outer race 202 abuts an annular shoulder 204 formed integral in the housing portion 200. The inner race 206 of the bearing 196 abuts an annular shoulder 208 formed integral on the sleeve 174 adjacent the gear 184 so as to retain the bearing 196 in position and thus to restrain the sleeve 174 from axial movement.

Referring now to FIGURE 2, the turbine driven gear 184 is in constant meshing engagement with a gear 210 formed integral with the outer ring element 212 of a suitable one-way clutch assembly 214, the purpose of which will become apparent as the description proceeds. The inner element 216 of the clutch assembly 214 is non-rotatably secured to a cross shaft 218 which extends parallel to the shaft 50 in the same horizontal plane therewith.

With continued reference to FIGURE 2, shaft 218 is journalled at its left-hand end in a ball bearing 220 press-fitted into a socket 222 formed in a housing 22 and retained in position by the planar end face of the collar portion 224 formed integral with the inner clutch element 216 so as to axially urge a retainer ring 226 in axial abutment with the inner race 228 of bearing 220. The opposite end of the shaft 218 is journalled by a conventional roller bearing assembly 230 having its outer race 232 press-fitted into a socket 234 formed in the end portion of the transmission housing 22.

Between the bearings 220 and 230, spaced apart gears 238 and 240 are non-rotatably mounted on shaft 218 and respectively mesh with the forward drive gear 86 and an idler gear 242. The idler gear 242 is mounted for free rotation on a stub shaft 244 secured in the housing 22 and is in constant meshing engagement with the reverse drive gear 128.

Figure 3:
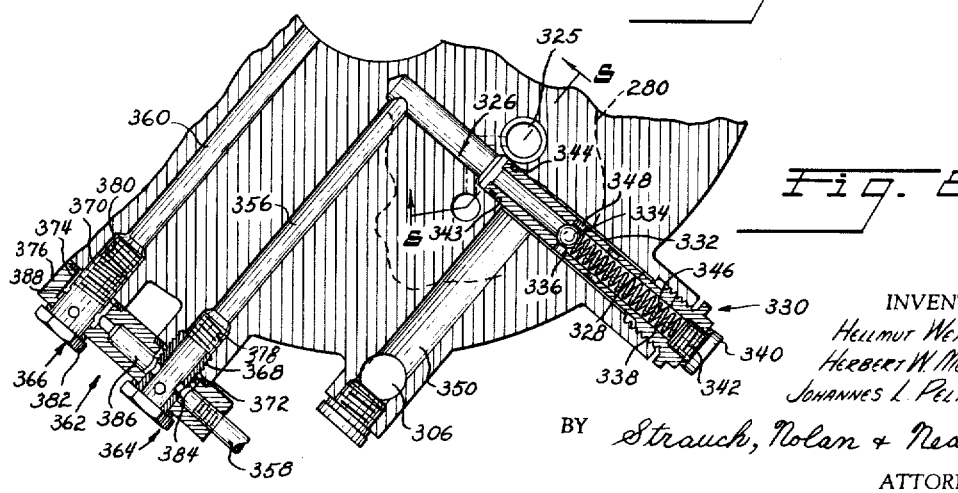
FIGURE 3 is a schematic view of the transmission of FIGURE 1.

With particular reference now to FIGURE 3 wherein the transmission 20 is shown in simplified form, it will be appreciated that by the above construction, the power input to shaft 30 delivered to the planetary gear set 38 is divided into two parts and transmitted to the output shaft 102 by separate gear trains, one mechanical and the other through a torque converter. The forward mechanical gear train is from the planet gear carrier 42 through shaft 50 to jaw clutch teeth 96. For the forward drive, the clutch collar 100 of clutch assembly 98 is selectively and axially shifted to the left so that the collar clutch teeth 99 drivingly engage the clutch teeth 96 driven by shaft 50 to thereby rotate the output shaft 102 in a selected direction.

The forward fluid coupling gear train is from the sun gear 44 of planetary gear set 38 through pump 166 and the turbine rotor 170 of the torque converter 168 to the gear 184 which is in continuous meshing engagement with the gear 210 of the one-way clutch assembly 214 to rotate the shaft 218 and gear 238 mounted thereon. The gear 238, being in constant meshing engagement with the gear 86 mounted on the shaft 50, delivers its part of the power and torque from the turbine 170 to the output shaft 102 through the forward and reverse clutch assembly 98. By this drive train structure, power and torque passing through the planetary carrier 42 of the planetary gear set 38 impressed upon the shaft 50 joins to drive the gear 86 and consequently the transmission output shaft 102 when the clutch collar 100 is shifted to its forward drive position.

The reverse mechanical gear train is from the planetary carrier 42 which is driven by the transmission input shaft 30 through the shaft 50 to the gear 86. Gear 86, being in continuous meshing engagement with gear 238, drives shaft 218 to transfer power to gear 240 which continuously meshes with idler 242 which, in turn, is in constant meshing with gear 128. When the clutch collar 100 is shifted to its reverse drive position so that the jaw clutch teeth 138 provided on gear 128 are engaged with the clutch teeth set 140 on the collar 100, power is thereby transmitted to rotate the output shaft 102 in a reverse direction.

The reverse fluid drive gear train is established initiating with the sun gear 44 of the planetary gear set 38 which drives the pump 166 of torque converter 168. The fluid energy produced by the pump 166 drives turbine 170 which is connected to gear 184. Gear 184, being in continuous meshing with the gear 210 of the one-way clutch 214, transfers power to the shaft 218 to aggregate with the power delivered by the mechanical gear train in driving the gear 240 which transmits the power to the output shaft 102 through gears 242, 128 and clutch assembly 98.

The one way clutch assembly 214 provided on the fluid drive power train functions to prevent rotation of the turbine rotor 170 by the mechanical gear train through gear 86 by normally permitting power to be transmitted in one direction from the torque converter 168 to the shaft 218. Referring to FIGURES 1 and 11, the outer ring element 212 is provided with opposed spaced apart annular side plates 245 affixed thereto as by pins 246. These side plates 245 are coaxially journalled on the collar 224 which is secured to shaft 218 and is provided with a plurality of spaced apart radially extending lugs 247. The peripheral surface 248 of collar 224 extending between adjacent lugs 247 is curved so as to form annular wedge-shaped spaces 249 between the peripheral surface of the collar 224 and the inner cylindrical surface of the outer ring element 212. Axially positioned in the wedge-shaped spaces 249 between adjacent lugs 247 are rollers 250. In order to prevent undesired lost motion between rollers 250, the outer ring element 212 and the collar 224, rollers 250 are biased by springs 252 to the left as viewed from FIGURE 11 to abuttingly engage shoes 251.

By this construction, rotation of turbine 170, and with it that of gear 184 and outer ring element 212, forces roller 250 into the smallest radial sections of the annular wedge-shaped spaces 249 so that they engage both the collar 224 and the outer ring element 212. This driving connection between the outer ring element 212 and the shaft 218 remains effective as long as the speed of the turbine-driven outer ring gear 212 exceeds that speed which is imparted to the shaft 218 by the mechanically driven shaft 50 by way of the gears 86 and 238. If, on the other hand, the speed of shaft 218 exceeds that of the outer ring element 212, the rollers 250 are displaced into the wider part of the wedge-shaped spaces 249 where the radial distance between the collar and the ring element 212 is greater than the diameter of the rollers so as to drivingly disconnect the shaft 218 from the outer ring element 212. Undue lost motion between the outer ring element 212 and the collar 224 is, as stated above, prevented by the abutting engagement of the rollers 250 against the spring-biased shoes 251.

In accordance with the present invention and with reference to FIGURES 1, 3 and 4, in order to stop the rotation of the pump 166 of torque converter 168, a brake system generally designated at 254 is provided and comprises an annular brake piston 256 mounted within the torque converter core 258 forming the toroidal torque converter fluid passageway 259.

This piston 256 is slidably mounted in an annular recess 260 formed in the core 258 and secured against rotation by one or a plurality of equiangularly spaced studs 262 which are fixed to the core 258 and axially project into bores 264 formed in the rear face of the piston 256. The braking face 266 of the annular piston 256 opposing the pump impeller 166 is sloped to conform wiht the surface of the pump impeller so that the entire surface of the face 266 abuttingly engages the pump impeller 166 when the former is shifted into engaging contact with the latter.

In order to axially shift the annular piston 256 toward the pump impeller 166, fluid is introduced into the annular chamber formed by the walls of the core recess 260 and by the piston 256 as will hereinafter be described. Thus, to establish a fluid-tight expansible chamber between the walls of the core recess 260 and the annular piston 256, inner and outer annular O-rings 270 and 272 are provided and are respectively seated in annular peripheral grooves 274 and 276 formed in the piston.

In order to introduce hydraulic fluid under pressure into the annular pressure chamber 268 to thereby effect axial movement of the annular piston 256 towards the torque converter pump impeller 166, a gear pump is provided of any conventional construction such as a conventional two-gear gear pump for withdrawing oil from the oil sump 278 and is generally indicated at 280, FIGURE 5. With continued reference to FIGURE 5, the gear pump 280 is provided with a cup-shaped casing 282 secured to the transmission housing section 284 by machine screws 285. This casing 282 encloses the conventionally fashioned pump gears 286 and 288 of the pump 280. The driver gear 288 is keyed at 289 to a driving stub shaft 290 journalled at its left end in a bearing cup 292 press-fitted into an opening formed in the casing 282. The stub shaft 290 extends through and beyond a through bore 294 formed in the transmission housing section 284 and is suitably journalled therein as indicated at 296. The driven gear 286 is journalled on pin 297 secured in the housing section 284 and is in constant meshing engagement with the driven gear 288.

In order to drive the gear pump 280, a gear 298 is non-rotatably mounted on the end of the stub shaft 290 which projects beyond the housing section 284. With reference now to FIGURES 1 and 5, this gear 298 is in constant meshing with a gear 300 which is affixed on an annular shoulder 302 formed integral with ring gear 36 of the planetary gear set 38. By this construction, it will be appreciated that upon rotation of the transmission input shaft 30 and consequently the ring gear 36, continuous operation of the pump 280 will be established through the gear train formed by gears 298 and 300.

With reference now to FIGURES 1, 6 and 7, in order to provide withdrawal of oil from the oil sump 278, an inlet passageway 306 (FIGURE 1) formed in the bottom portion of the transmission housing 22 communicates at one end with the inlet of pump 280 and intersects at its other end, at right angles, a passage 308 which is also formed in the botom section of the transmission housing 22. This passage 308 communicates with a chamber 310 formed in the bottom section of the transmission housing 22 in which a conventional cartridge-type oil filter 312 (FIGURE 6) is provided. The filter 312 comprises a cylindrical filter cartridge 314, the inner end of which is snugly supported in a socket 316 formed at the inner end of the chamber 310 adjacent the entrance to the passage 308 so that the cartridge 314 is positioned in spaced relation to the side walls of the chamber 310. The outer end of the filter cartridge 314 is suitably axially secured to a plug 317 having a hexagonal head 318 extending beyond the chamber 310 and a threaded body section 320 which is threadedly received in the outer end of chamber 310. By this construction, the filter is readily removed by unscrewing the plug 317 with a suitable tool and axially removing the cartridge filter assembly 312 from the chamber 310.

Oil used for hydraulic fluid is drawn by the pump 280 from sump 278 through passage 322 (FIGURE 7) into the chamber 310 where it passes through the side walls of the filter cartridge 314 into the interior thereof which communicates with passages 308 and 306 and the pump inlet.

Referring now to FIGURE 8, the oil discharge port 325 from the gear pump 280 communicates with a stepped bore 326 formed in the transmission housing section 284. Concentrically mounted in spaced relation in the bore 328 of stepped bore 326 is a conventional ball-type pressure relief valve 330 which comprises a tubular valve body 332 and a ball 334 cooperating with a valve seat 336 formed in the inner end of the valve body 332. The valve ball 334 is biased by a spring 338 which engages the ball 334 at one end and is seated at its other end in a plug 340 provided with a threaded section 342 to engage the interior of the valve body 332. The inner end of the valve body 332 below the valve seat 336 is sealed fluid tight about its periphery with a socket 343 formed coaxially at the base of bore 328 by a suitable O-ring 344 which is seated in an annular peripheral groove formed in body 332. The outer end of the valve body is threaded to be received in an internally threaded bore 346 of stepped bore 326.

The valve 330 is in a normally closed position and opened at a predetermined pressure to return the fluid to the inlet of the gear pump 280 through radial openings 348 in the valve body 332. The radial openings 348 communicate with the annular channel formed between the side wall of bore 328 and the valve body 332 which is intersected by a passageway 350 communicating with the pump inlet passageway 306.

With continued reference to FIGURE 8, inwardly of the pressure relief valve 330, the stepped bore 326 intersects, at right angles, a passageway 356 which extends to communicate with an externally mounted brake supply line 358 and the torque converter make-up supply passage 360 through a metering assembly 362 which functions to control the distribution of oil from the discharge of pump 280. This metering assembly 362 comprises two ported metering members 364 and 366 having sleeves 368 and 370 which concentrically extend through spaced apart enlarged recesses 372 and 374 formed in the metering body member 376 and are removably secured in bores 378 and 380 formed in housing 22. Each metering member 364 and 366 is provided with an enlarged hexagonal head 382 extending above the body member 376 to facilitate removal thereof for cleaning purposes.

Oil delivered under pressure from the discharge of the gear pump 280 is transmitted through the passage 356 which communicates with the interior of sleeve 368. The oil, under pressure, is distributed through radially formed passageways 384 formed in the sleeve 368 to a chamber formed by the sleeve 368 and the side walls of recess 372 and which communicates with the brake supply line 358 and a short passage 386 formed in the body member 376. The passageway 386 delivers the oil under pressure to a chamber formed by the recess 374 and surrounding the sleeve 370. Radially formed passages 388 in sleeve 370 provide for passage of the oil from passageway 386 to the interior of sleeve 370 which communicates with the torque converter supply passage 360 which delivers make up oil to the torque converter 168.

Referring now to FIGURES 1, 4, 9 and 10, the brake line 358 extends externally to the top of the transmission 20 where it terminates at the inlet passage 392 (FIGURE 9) of control valve 394 which will be hereinafter described. The supply outlet 396 (FIGURE 1) of the control valve 394 is connected to a conduit 398 which communicates with a longitudinally extending bore 400 (FIGURE 4) formed in the torque converter housing 63. Coaxially formed with bore 400 is a counterbore 402 which provides an annular shoulder 404 and receives a stub tube 406 abuttingly against the shoulder 404. Tube 406 extends across the turbine toroidal passageway 259 and is received in a bore 408 formed in the torque converter core 258 and abuts an annular shoulder 410 formed between bore 408 and a smaller diameter coaxially extending bore 412 which terminates in the enlarged brake pressure chamber 268.

In order to prevent leakage of fluid passing through the brake supply tube 406 into the torque converter toroidal passageway 259, suitable O-rings 414 and 416 are provided and are seated in annular peripheral grooves formed near each end of the tube 406 to provide a fluid-tight seal with the bores 408 and 402.

Referring now to FIGURES 1 and 10, the control valve 394 comprises a tubular valve body 422 which is coaxially mounted in a bore 424 formed in a housing extension 426 of the transmission housing 22. This valve body 422 is provided with three radially extending series of ports 428, 430 and 432 which are axially spaced equidistantly apart. Mounted for axial movement in the valve body 422 is a spool-type valve plunger 434 having a central reduced diameter section 436 which forms an annular chamber 438 with the valve body 422. The axial length of the reduced diameter section 436 and the longitudinal distances between the ports 428, 430 and 432 is such that only two ports communicate with the annular chamber 438 in any given position of the valve plunger 434.

The radial port 432 communicates with the brake supply line 358 through an inlet passage 392 (FIGURE 9) formed in housing extension 426 and the radial port 430 is axially aligned with an outlet passageway 396 (FIGURES 1 and 10) which communicates with the externally extending conduit 398 leading to the torque converter housing 63. The radially extending port 428 is intersected by an annular passage 444 formed in the valve body 422 and which communicates with the interior of transmission 22 through annular passage 446.

Biasing the valve plunger 434 to the left as viewed in FIGURES 1 and 10 is a helical spring 452 which axially abuts the planar end face of the plunger 434. The spring 452 is tensioned by movement of a lever 454 which is operatively connected to the engine throttle (not shown) and journalled on the housing extension 426. An eccentric adapter 456 fixed on a vertical shaft 458 to which the lever 454 is suitably affixed engages the planar end face of a cylinder 460 which is horizontally shiftably mounted in a bore 462 of housing extension 426 and which is provided at its inwardly facing end with a piloting protrusion 464. This piloting protrusion 464 axially engages the spring 452 so that by axially shifting cylinder 460 by movement of the lever 454, the spring is selectively tensioned to apply an axial force to the valve plunger 434 which tends to move it to the left as viewed from FIGURES 1 and 10.

Functioning to move the valve plunger 434 to the right as viewed from FIGURES 1 and 10 is a conventional fly-ball governor 470 fixedly mounted for rotation on a stub shaft 472 as by pin 474. Stub shaft 472 is journalled in ball bearing assemblies 476 and 478, the inner races of which are separated by annular spacers 480 and 482 and which abut gear 484 pinned to the shaft 472 at 486 for rotation therewith. Gear 484 meshes with an idler gear 488 mounted for free rotation on a shaft 490 secured in the transmission housing extension 426 which is in constant meshing engagement with gear 86 on the shaft 50. By this structure, it will be appreciated that rotation of the shaft 472 causes the disc shaped member 492 of the fly-ball governor which is secured at 494 to the plunger 434 to move to the right and thereby apply an axial force to the plunger to tend to shift it to the right against the bias of spring 452.

In operation of the braking system, the gear pump 280 (FIGURE 5) is continuously operating through the gear train established by gears 298 and 300 to draw oil from the oil sump 278 whenever the shaft 30 is rotated. When the control valve 394 is in closed position (FIGURES 1 and 10) preventing passage of oil from the discharge of the gear pump 280 to the annular brake piston chamber 268 (FIGURE 3), the hydraulic fluid is recirculated from the central valve body port 430 back to the oil sump 278 through chamber 438, port 428 and annular passages 444 and 446.

Referring now to FIGURES 1, 3 and 10, it will be appreciated that the valve plunger 434 of control valve 394 is acted upon by opposed axial forces. From the left, as viewed from FIGURE 10, the fly-ball governor 470 functions to apply an axial force tending to shift the plunger to the right when shaft 472 is rotated.

Since the governor 470 is drive connected to the shaft 50 through the gear train established by gears 484, 488 and 86, the magnitude of the force applied by the governor 470 is consequently a function of the speed of shaft 50 and operates at a fixed speed ratio thereto. Since the shaft 50 is clutched to the output shaft 102 when the transmission operates in a forward direction, the shaft 472 which drives the governor 470 consequently rotates at a fixed ratio to the transmission output in a forward direction.

The force opposing the action of the fly-ball governor 470 is applied axially to the control valve plunger 434 by the spring 452, the tension of which is selectively varied by actuation of the engine throttle which is operatively connected to lever 454. Consequently, it will be appreciated the passage oil through the control valve 394 and, therefore, the application of the brake 256 to the turbine pump impeller 166 is a function of both the transmission output speed and the engine throttle position of the vehicle.

When the vehicle driven by the transmission unit 20 is at a rest position, the valve plunger 434 of control valve 394 is biased to the left (FIGURES 1 and 10) by spring 452 thus closing off the supply line 358 by preventing communication between the valve body ports 430 and 432 through the annular chamber 438. When the accelerator of the vehicle is depressed to move the vehicle forward, the tension of spring 452 is increased and the valve plunger 434 is biased more forcefully to the left (FIGURE 10) which is the closed position.

As the vehicle begins to move, the speed of shaft 50 and, consequently the speed of shaft 472 on which the fly-ball governor 470 is operatively mounted, increases.

Thus, as the speeds of shafts 50 and 472 increase, the governor 470 exerts an axial force on the valve plunger 434, tending to overcome the force of the spring 452 and thereby tending to shift the valve plunger to the right (FIGURES 1 and 10) toward open position. When the speed of shaft 472 reaches a predetermined value to produce a sufficient force for overcoming the bias of spring 452, the valve plunger 434 is shifted gradually to the right (FIGURES 1 and 10), thus opening the pipe line 358 to the pipe line 398 by establishing communication between the valve body ports 430 and 432 through the annular chamber 438.

Hydraulic fluid then is discharged from the gear pump 280 through pipe line 398 to the annular brake piston chamber 268 (FIGURE 4). Accordingly, the annular brake piston 256 is shifted to the left (FIGURES 1 and 4) toward the converter pump impeller 166 until it abuttingly engages the pump impeller 166 and thereby frictionally arrests rotation thereof.

In accordance with the present invention, the force applied to the annular brake piston 256 is opposed so as to cushion the braking force and thereby bring the pump 166 shocklessly and smoothly to a stop without causing any abrupt or jerking action attributed to fast stopping. This is accomplished in the present invention largely on account of the characteristics of the torque converter 168 of the transmission 20 in that the converter pump 166 naturally reduces in speed as the transmission output speed increases. This characteristic is fully explained in said co-pending application Serial No. 781,495 and serves, when combined with the braking system 254 described above, to provide a completely shockless frictional braking of the torque converter pump 166 as will now be described.

As the vehicle begins to move, the converter pump 166 rotates at its maximum speed and as the speed of the vehicle increases, the pump speed decreases. The pump 166 serves to establish the torque converter operating pressure within the toroid 259 of the torque converter 168. Consequently, as the speed of pump 166 decreases, the fluid pressure within the fluid toroid 259 correspondingly decreases. Thus, when the valve plunger 434 is initially shifted to open position allowing fluid under pressure to flow into the annular brake piston chamber 268, the fluid pressure in the fluid toroid 259 which opposes the movement of brake 256 to its braking position is relatively high. This opposing pressure established by the fluid in the toroid 259 is slowly overcome by the fluid pressure acting in the brake piston chamber 268 to force the brake piston 256 to move into facial frictional abutment with the pump impeller 166.

Due to the natural tendency of the converter pump 166 to slow down as the vehicle speed increases and the initial slight frictional contact of the brake piston 256 with the pump impeller 166, the consequent loss of pump speed results in a further reduction of fluid pressure in the converter toroid 259. Thus the fluid pressure opposing the brake force is further decreased thereby enabling the brake piston 256 to be more forcefully biased against the pump 166. From the foregoing, therefore, it will be appreciated that by the gradual application of the brake piston 256, the stopping of the pump is smooth and completely shockless without any interrupting jerks.

When the pump 166 is stopped and prevented from rotation by application of the brake piston 256, the sun gear 44 of the planetary gear set 38 which is rigidly secured to the pump 166 also is prevented from rotating. Thus, a direct mechanical drive is facilitated between ring gear 36 and the planetary carrier 42 which is rigidly secured to the shaft 50 which is coupled to the output shaft 102 by the forward and reverse clutch assembly 98.

From the foregoing, it will be appreciated that by the gradual controlled application of the brake, the pump speed is gradually reduced to zero over a range of transmission output speeds rather than abruptly reducing the speed of pump 166 to zero at a particular and precise transmission output speed. As a result, the transmission torque output curve and more particular the torque multiplication or ratio curve (torque output/torque input) is a substantially smooth continuous curve which gradually decreases in magnitude without abrupt decreases at any one particular transmission speed until the pump 166 is fully braked and is thereafter a constant linear value depending upon the gear ratio provided for in the planetary gear set 38.

When the speed of the vehicle again is reduced so that the valve plunger 434 is shifted again to its closed position, the fluid pressure urging the brake piston 256 into engagement with pump impeller 166 is decreased and overcome by the fluid pressure in the toroid 259 so as to release the brake. In the closed position, the fluid discharge from gear pump 280 is vented through the port 428 and the annular passages 444 and 446 into the oil sump 278.

Referring now to FIGURE 12, another construction embodying the principles of the invention is schematically illustrated. Since most of the component parts illustrated in FIGURE 12 are the same as those disclosed and described in connection with the embodiment of FIGURES 1–11, like reference numerals are used for identical parts and no detailed description thereof is required.

Accordingly, with continued reference to FIGURE 12, the transmission unit 500 illustrated therein is provided only with a forward drive and eliminates the forward and reverse clutch assembly 98 of FIGURE 1. In this embodiment, the ring gear 36 of the planetary gear set 38 is rigidly connected to the transmission input shaft 30 which is suitably coupled to an engine crank shaft 502 for rotation therewith. The planetary carrier 42 of the planet gears 39 is provided with a sleeve 504 which terminates in a gear 506. This gear 506 is in continuous meshing engagement with a gear 508 non-rotatably secured to the output shaft 509 so as to establish a mechanical reduction gear train between the carrier 42 and output shaft 509.

The sun gear 44 of the planetary gear set 38 is connected to a suitably journalled shaft 510 which extends through the sleeve 504 and drivingly connects the torque converter impeller 166 to the torque converter 168. The turbine 170 of the torque converter 168 which is driven by the energy produced by pump 166, is drive connected to a suitable journalled sleeve 512 mounted concentric with shaft 510 and terminates in a gear 514. The gear 514 is in continuous meshing with the gear 210 which is drivingly connected to the outer ring element 212 of one-way clutch 214 having it sinner element 216 affixed to shaft 509 for rotation therewith. This clutch 214, as hereinbefore described, prevents the turbine 170 from being driven by the output shaft 509. By this structure, it will be appreciated that the fluid drive gear train is established initiating with the sun gear 44 of planetary gear set 38 which transmits power to the torque converter pump 166 so as to drive the converter turbine 170. The power transmitted to the turbine 170 is impressed upon the output shaft 509 through reduction gear train formed by gears 514 and 210 and the one-way clutch 214.

The brake system for the torque converter pump 166 is generally indicated at 516 and comprises an annular brake piston 518 mounted for axial movement in an annular recess 520 formed in the transmission housing 522. In order to shift the brake piston 518 to a braking position frictionally against the face 524 of the pump impeller 166, the gear pump 280 is provided and driven by gears 300 and 298 from the transmission input shaft 30 or the crank shaft 502 so that hydraulic fluid is drawn from a sump (not shown) provided in the transmission and transmitted under pressure through the lines 398 and 526 by pump 280 to the annular recess 520 formed in the transmission housing 522.

The hydraulic fluid discharged by the pump 280 is controlled by the control valve 528 which is actuated by the centrifugal fly-ball governor 470 connected to output shaft 509. The control valve 528 is the same as the control valve 394 described in connection with the embodiment of FIGURE 1 except that the spring 452 is secured in the valve casing 532 to bias the valve plunger 434 axially to the right, the tension of which is not varied by actuation of the vehicle accelerator. The force applied by the spring 452 to the valve plunger 434 normally holds the valve plunger 434 in closed position thereby preventing flow of fluid to the brake piston recess 520.

When the vehicle begins to accelerate forward from a rest position and the speed of shaft 509 concomitantly increases, the fly-ball governor 470 becomes operative to exert a force on the valve plunger 434 tending to shift it to the left against the bias of spring 452. At a predetermined speed of the output shaft where the torque converter 168 no longer contributes efficiently to the overall power output, the force exerted by the governor 470 which increases with the speed of the output shaft 509, overcomes the bias of spring 452 and shifts the valve plunger 434 axially to the left to an open position thereby permitting hydraulic fluid to flow, under pressure, through the line 526 to the annular brake recess 520 where it exerts a force on the back face of the annular brake piston 518 tending to shift the piston 518 to the right to a frictional braking position against the face 524 of the pump impeller 166.

The braking pressure applied to the brake piston 518 to shift it to the right is opposed by the fluid pressure in the torque converter toroid 259 as herein before described. As the applied braking pressure gradually overcomes this opposing force exerted on the braking face of the brake piston 518, the piston 518 is shifted to the right and gradually frictionally engagegs the pump impeller 166 without abrupt movement. The braking action, as hereinbefore described, increases with the decreasing speed of the pump impeller 166 until the movement of the pump 166 is fully arrested without abrupt or sudden stopping thereof. Thus, the power-splitting phase of the operation of the transmission changes over to the mechanical operation wherein all the power is mechanically transmitted through the transmission in a smooth, soft and shockless manner.

When the vehicle is slowed down, the force applied by the centrifugal governor 470 to hold the valve plunger 434 in open position decreases and the spring 452 urges the plunger 434 to the right toward closed position to reduce the braking force applied to piston 518. At the same time, the slowing of the vehicle increases the speed of the converter pump 166 so as to increase the fluid pressure in the converter toroid tending to overcome the braking force applied to the piston 518 and release the brake. The release of the annular brake piston may be assisted by return springs (not shown). Normally, however, the release springs are not necessary because sufficient brake releasing pressure in the converter toroid 259 is quickly built up to overcome the normally low braking pressure even though the pump impeller 166 is initially gripped by the brake piston 518.

Alternatively, the pump 280 producing the braking pressure can be driven by the output shaft 509. Consequently, the pressure thereby produced is functional to the output speed of the whole transmission unit 500. Under these conditions, the pump 280 when operating in a closed fluid circuit with the annular brake piston 520 can function to operate the brake 518 without the use of the governor 470 and the control valve 528.

Alternatively, the governor 470 may be operatively connected to a system which mechanically or electrically transforms the force developed by the governor 470 upon rotation of shaft 509 into the braking power necessary for shifting the brake piston 518.

Referring now to FIGURE 13, wherein a further construction embodying the principles of the present invention is illustrated, the reduction gears 514 and 210 and the one-way clutch 214 of FIGURE 12 are replaced by a planetary gear set generally indicated at 540. This planetary gear set 540 comprises a planetary gear carrier 542 rigidly secured to an extension 544 of the sleeve 504 and carries planet gears 546 which are in continuous meshing engagement with a rigid gear 548 and a sun gear 550.

The sun gear 550 is rigidly secured to the sleeve 512 so as to be driven by the torque converter turbine 170.

In order to transmit the power developed by the torque converter 168 and to prevent the turbine 170 from being driven by the output shaft 509, the ring gear 548 of the planetary gear set 540 is provided with a brake generally indicated at 552 and comprises an annular brake piston 554 mounted concentrically with shaft 510 for limited axial movement in an annular recess 553 formed in the housing 522. The brake piston 554 is actuated by the fluid pressure in the torque converter toroid 259 which is transmitted through axial passages 555 to shift the brake piston 554 axially to the right to facially engage the ring gear 548 against the bias of release springs 556 suitably mounted in the housing 522.

By this construction, it will be appreciated that when the ring gear 548 is held stationary by the brake piston 554, the planetary gears 546 of planetary gear set 540 are then forced by the turbine driven sun gear 550 to roll around the arrested ring gear 548 thus transmitting rotary motion to the planet carrier 542 and through the sleeve extension 544 to gear 506.

In this manner, the control of the transmission of power from the turbine 170 to the output shaft 509 is dependent on the torque converter pressure serving to control the operation of the converter pump impeller 166 as well as the turbine side of the differential planetary gear set 540. By selecting the tension of springs 556, the adjustment of the brake 552 is facilitated to prevent actuation of the brake piston 554 to braking position during the idling speed of the vehicle engine (not shown). Consequently, the torque of the turbine 170 is not imparted to the output shaft 509 during this period.

In place of the springs 556, other biasing means such as fluid pressure operated means may be used for biasing the brake piston 554 to a brake-released position.

With reference to FIGURE 14, such a fluid pressure operated control valve mechanism is generally designated at 562. This control valve 562 comprises a spool-type plunger 564 shiftably mounted in a bore 566 formed in the transmission housing 522 and which is provided with a central reduced diameter section 568 forming an annular chamber 570 with the side walls of bore 566. The plunger 564 is biased upwardly by a spring 572 which axially engages the lower planar end face of the plunger 564 and is secured in a plug 574 threadly secured in the bore 566, so as to vary the tension of spring 572.

An inlet passage 576 establishes communication between the central portion of the bore 566 and the toroid 259 of the torque converter 168. An outlet passage 578 spaced axially below the inlet passage 576 at a predetermined distance which is less than the axial length of the reduced diameter plunger section 568 is provided and extends from bore 566 to communicate with the annular brake piston recess 553.

A by-pass passage 580 having a suitable throttle valve 582 intersects the inlet passage 576 and communicates with the upper end of bore 566 so as to transmit the fluid pressure of the torque converter toroid 259 to the upper end of the plunger 564 to thereby urge it downwardly against the bias of the spring 572. In order to release the pressure established at the upper end of the plunger 564, a throttled discharge passage 584 is provided and communicates with the upper end of bore 566 adjacent the bypass passage 580. Spaced axially above the inlet passage 576 and communicating with the bore 566 at a distance which is greater than the axial length of the enlarged diameter end section of the plunger 564 is an orifice passage 586 which intersects the bypass passage 580 upstream from the throttle 582.

In FIG. 14, the control valve 562 is shown in a position at which the vehicle driven by the transmission unit is at rest. At this position, the plunger 564 prevents passage of fluid from the inlet passage 576 to the outlet passage 578. As the pressure in the torque converter toroid 259 increases it is slowly transmitted through the throttled bypass passage 580 to axially urge the plunger 564 downwardly against the bias of spring 572. As soon as the plunger 564 frees the orifice formed by passage 586, the plunger becomes fully charged by the torque converter pressure to maintain the plunger in a downwardly-shifted fully-opened position where inlet passage 576 communicates with outlet passage 578 thereby admitting fluid pressure to the annular recess 553 for actuating the brake piston 554. The admission of fluid pressure through the orifice passage 586 serves to obviate undesired back and forth axial shifting movement of the brake piston 554 due to small variations of the torque converter pressure in the toroid 259. This action serves to eliminate premature application of the brake to the ring gear 548.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a hydrodynamic power shunt transmission having a power input and output, means coupling said input with said output including parallel torque transmitting trains for driving said output in a selected direction including a torque converter forming a part of one of said trains, said torque converter having a rotatable pump drive connected to said input and a turbine drive connected to said output, and means including braking means controlled by the fluid pressure in said torque converter and by the speed of said output member for shocklessly braking said pump by said braking means without abrupt changes in pump speed and torque delivered to said output under certain predetermined speed conditions of said output.

2. In a hydrodynamic power shunt transmission having a housing, power input and output members rotatably mounted in said housing, means providing separate parallel power trains for coupling said input member with said output member for driving said output member in a selected direction, a torque converter forming a part of one of said power trains and having a rotatable pump impeller drive connected to said input member and a turbine drive connected to said output member, and automatic means including at least one braking member controlled by the fluid pressure established in said torque converter and by the speed of said output member for shocklessly frictionally braking and preventing rotation of said pump impeller by means of said braking member under predetermined speed conditions of said output member.

3. In a hydrodynamic power shunt transmission having a housing, power input and output members rotatably mounted in said housing, means providing first and second power trains for coupling said input member with said output member for driving said output member in a selected direction, a torque converter forming a part of said first power train and including means defining a continuous fluid circuit, a pump in said circuit drivingly connected through said first power train to said input member and a rotatable turbine in said circuit driven by the energy produced by said pump; gear train drive means connecting said turbine to said output member; and means controlled by the fluid pressure established in said fluid circuit and the speed of said output member for shocklessly braking said pump without abrupt change in the speed of said output member, comprising a brake operative when actuated to frictionally engage said pump and means for automatically actuating said brake at a predetermined speed of said output member so that the power delivered by said input member to said output member is limited to transmission through said second power train.

4. The transmission as defined in claim 3 wherein said means defining a fluid circuit comprises a toroidal core and wherein said brake is shiftably mounted in a recess formed in said core to define a hydraulic pressure chamber therewith.

5. The transmission as defined in claim 4 wherein said means for automatically actuating said brake comprises a control valve having a member shiftable between open and closed positions for controlling the introduction of fluid into said chamber, spring means for biasing said member to closed position, and a governor responsive to the speed of said output member and operative when actuated to shift said member toward open position against the bias of said spring.

6. The transmission as defined in claim 5 wherein said control valve is provided with passageway means for releasing the fluid pressure exerted on said brake and wherein pump means including a fluid supply source is provided for continuously delivering fluid under pressure to said control valve, said passageway means serving to recirculate the fluid delivered to said control valve by said pump means to said source when said valve member is in closed position.

7. The transmission as defined in claim 6 wherein means are provided for delivering hydraulic make-up fluid from said pump means to said converter fluid circuit and wherein said pump means comprises a gear pump drivingly connected to said input member.

8. In a power transmission, differential gear means having an input, a first output drivingly connected to said input by a ratio change gear train and a second output drivingly connected to said input by a second ratio change gear train, a transmission output connected to said first output of said differential gear means; a torque converter comprising means defining a continuous fluid circuit, a pump impeller in said circuit connected to said second output of said differential gear means, a turbine in said circuit and a stator interposed between the outlet of said impeller and the inlet of said turbine; a torque multiplying gear train drive connecting said turbine and said first output whereby the torque transmitted to said first output through said first ratio change gear train is augmented by the torque transmitted in series through said second ratio change gear train, said torque converter and said torque multiplying gear train; a brake operative when actuated to stop and prevent movement of said pump impeller and automatic means for actuating said brake to render said torque converter inoperative so that transmission of power from said input to said transmission output is limited to transmission through said first change ratio gear train of said differential gear mechanism.

9. The transmission as defined in claim 8 wherein said multiplying gear train comprises a one-way clutch to limit the direction of transmission of power from said turbine to said first output and thereby prevent said turbine from being driven by said first output.

10. The transmission as defined in claim 8 wherein forward and reverse clutch means are provided for coupling said first output to said transmission output to drive said transmission in a selected direction.

11. The transmission as defined in claim 8 wherein said automatic means comprises means responsive to the speed of said output for controlling the actuation of said brake and wherein means are provided for disposing said brake in communication with said fluid circuit so that the fluid pressure established by said impeller opposes and cushions the actuation of said brake to shocklessly brake said pump impeller.

12. The transmission defined in claim 11 wherein said torque converter is provided with toroidal core in defining said fluid circuit and wherein said brake comprises an annular piston shiftably mounted in a recess formed in said core coaxial with said impeller for facial frictional engagement therewith when actuated, said piston forming a hydraulic pressure chamber with the walls of said recess; said automatic means comprising means for introducing fluid under pressure into said pressure chamber to shift said piston to brake actuating position, a control valve having a member movable between open and closed positions for controlling the introduction of fluid into said chamber, spring means for biasing said member to closed position, and a governor responsive to the speed of said transmission output and operative when actuated to apply a progressively increasing force as the speed of said output increases to move said member to an open position against the bias of said spring.

13. The transmission as defined in claim 12 wherein the biasing force of said spring is controlled by an input power throttle control to oppose opening movement of said member by increasing the biasing force of said spring as said input power throttle control is moved to positions calling for increased input power.

14. The transmission as defined in claim 8 wherein said impeller is a radial flow centrifugal pump and said turbine is a reaction type turbine rotatable in a direction opposite to that of said pump.

15. In a brake system for use in a hydrodynamic power shunt transmission having an input, an output, parallel power trains coupling said input and said output, and a torque converter forming a part of one of said power trains and including a pump operably connected to said input and a turbine driven by the energy produced by said pump and operably connected to said output wherein said torque converter is characterized by a gradually decreasing pump speed as the speed of said output increases: braking means operative when actuated to stop and prevent rotation of said pump, automatic means responsive to the speed of said output for actuating said braking means, and means for opposing and cushioning the actuation of said braking means by application of the internal fluid pressure established by said pump whereby said pump is braked by said braking means without abrupt change in the speed of said pump or the torque delivered to said output.

16. The brake system as defined in claim 15 wherein said brake means comprises means defining a hydraulic pressure chamber, a brake piston shiftable in said chamber to frictionally engage said pump and wherein said automatic means comprises means for introducing hydraulic fluid under pressure into said chamber to shift said piston to brake actuating position, a control valve operative between open and closed position for controlling the introduction of hydraulic fluid into said chamber, a governor energized by the speed of said output and operative when energized to open said valve at a predetermined speed of said output.

17. The brake system as defined in claim 16 wherein means controlled by an input power control condition are provided for opposing the actuation of said control valve to open position and thereby retarding actuation of said piston.

18. In a hydrodynamic power shunt transmission, first differential gear means having an input, a first output drivingly connected to said input by a first ratio change gear train and a second output drivingly connected to said input by a second ratio change gear train, a transmission output connected to said first output; a torque converter comprising means defining a continuous fluid circuit, a pump in said circuit connected to said second output of said differential gear means, a turbine in said circuit and a stator interposed between the outlet of said pump and the inlet of said turbine; second differential gear means having an input connected to said turbine, a first output drivingly connected to said input by a first ratio change gear train and a second output drivingly connected to said input by a second ratio change gear train; means connecting said first output of said second differential gear means to said first output of said first differential gear means, brake means responsive to the fluid pressure in said fluid circuit for braking said second output of said second differential gear means to establish transmission of power to said first output of said first differential gear means in series through said second ratio change gear train of said first differential gear means, said torque converter, and said first ratio change gear train of said second differential gear means to thereby augment the torque transmitted to said first output of said first differential gear means through said first ratio change gear train of said first differential means; a brake operative when actuated to stop and prevent movement of said pump, and automatic means for actuating said brake to render said torque converter inoperative so that the transmission of power from said input of said first differential gear means to said transmission output is limited to transmission through said first change ratio gear train of said first differential gear train.

19. The transmission as defined in claim 18 wherein said automatic means comprises means responsive to the speed of said transmission output for controlling the actuation of said brake and wherein means are provided to communicate the fluid pressure of said fluid circuit to said brake to oppose and cushion actuation thereof to shocklessly brake said pump.

20. The transmission as defined in claim 18 wherein said second differential gear means comprises a sun gear connected to said turbine, a planetary carrier coaxially rotatable relative to said sun gear and connected to said transmission output through said first output of said first differential gear means, a plurality of planetary pinions in constant mesh with said sun gear, and a rotatable ring gear in constant mesh with said pinions; said brake means comprising a brake piston operative when actuated by the fluid pressure in said fluid circuit to prevent rotation of said ring gear.

21. The transmission as defined in claim 18 wherein spring means are provided to bias said brake to brake releasing position and wherein control means are provided for actuation of said brake comprising means forming a hydraulic fluid chamber with said brake and means for introducing hydraulic fluid from said fluid circuit into said chamber to shift said brake to brake actuating position and including a control valve having a member automatically operative between open and closed positions in response to the fluid pressure in said fluid circuit and in said chamber wherein fluid pressure acting on said member serves to bias said member toward open position.

22. The transmission as defined in claim 21 wherein means are provided in said control valve for eliminating back and forth shifting movement of said brake due to slight variations in the magnitude of pressure in said fluid circuit.

23. In a hydrodynamic power shunt transmission having a power input and output, means coupling said input with said output including parallel torque transmitting trains for driving said output in a selected direction including a torque converter forming a part of one of said trains, said torque converter having a rotatable pump connected to said input and a turbine connected to said output, means including at least one braking member operative when actuated to frictionally engage and arrest movement of said pump, automatic means operable in response to a predetermined speed of said output member for applying a first force to said braking member to actuate said braking member to a braking position, and means for opposing and cushioning the actuation of said braking member by applying pressure fluid in said torque converter to predetermined surfaces of said braking member to exert a second force on said braking member in opposition to said first force.

24. The hydrodynamic power shunt transmission as defined in claim 23, an input power control operable to be selectively conditioned for varying the magnitude of power delivered to said power input, and means operably connected to said input power control for establishing a third force that varies in correspondence with changes in the condition of said input power control and for continuously applying said third force to retard actuation of said braking member to said braking position in opposition to said first force.

References Cited in the file of this patent
UNITED STATES PATENTS

| | | |
|---|---|---|
| 2,570,889 | Van Lammeren | Oct. 9, 1951 |
| 2,755,688 | Swennes | July 24, 1956 |
| 2,853,855 | Ahlen | Sept. 30, 1958 |